US006706182B2

(12) United States Patent  
Schuyler

(10) Patent No.: US 6,706,182 B2
(45) Date of Patent: *Mar. 16, 2004

(54) CAGED PLEATED FILTER CARTRIDGE ASSEMBLIES AND FILTRATION SYSTEMS EMPLOYING THE SAME

(75) Inventor: Charles C. Schuyler, Baltimore, MD (US)

(73) Assignee: Pall Corporation, Timonium, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/983,220

(22) Filed: Oct. 23, 2001

(65) Prior Publication Data

US 2003/0075493 A1 Apr. 24, 2003

(51) Int. Cl.⁷ .......................... B01D 27/06; B01D 27/14; B01D 29/54
(52) U.S. Cl. ................... 210/237; 210/238; 210/323.2; 210/345; 210/451; 210/462; 210/463; 210/455; 210/471; 210/493.1; 210/493.2; 210/497.01
(58) Field of Search .................. 210/322, 323.1–323.2, 210/345, 232, 459, 462, 453–454, 455–457, 463, 470, 471, 437, 237–238, 493.1–493.2, 497.01

(56) References Cited

U.S. PATENT DOCUMENTS

| | | | | | |
|---|---|---|---|---|---|
| 512,931 | A | * | 1/1894 | Aims, Jr. ................. | 210/323.2 |
| 2,921,686 | A | * | 1/1960 | Forman et al. .......... | 210/323.2 |
| 3,615,016 | A | * | 10/1971 | Soriente et al. ............. | 210/232 |
| 3,747,765 | A | * | 7/1973 | Nowak ........................ | 210/238 |
| 4,419,234 | A | * | 12/1983 | Miller et al. ................. | 210/232 |
| 4,552,669 | A | * | 11/1985 | Sekellick ..................... | 210/798 |
| 5,211,846 | A | * | 5/1993 | Kott et al. ................... | 210/232 |
| 5,476,585 | A | * | 12/1995 | Mills ........................... | 210/232 |
| 5,685,985 | A | | 11/1997 | Brown et al. ............... | 210/450 |
| 5,904,846 | A | | 5/1999 | Clements et al. ...... | 210/321.77 |
| 6,096,207 | A | | 8/2000 | Hoffman, Jr. et al. ...... | 210/232 |
| 6,103,119 | A | | 8/2000 | Clements et al. ........ | 210/493.1 |
| 6,251,273 | B1 | * | 6/2001 | Jawurek et al. ............. | 210/232 |
| 6,495,037 | B1 | * | 12/2002 | Schuyler ..................... | 210/232 |
| 2002/0153297 | A1 | * | 10/2002 | Bozenmayer ............... | 210/232 |

* cited by examiner

Primary Examiner—W. L. Walker
Assistant Examiner—Marianne S. Ocampo
(74) Attorney, Agent, or Firm—Nixon & Vanderhye P.C.

(57) ABSTRACT

A caged filter cartridge assembly has a pair of coaxially spaced-apart end plates, and a number of tubular filter cartridges extending between said end plates. These end plates include seat recesses having a coaxially disposed retaining ring establishing an annular terminal lock edge. The filter cartridges include end caps at each opposed end thereof which are received within respective ones of said seat recesses. The end caps have at least one annular lock ring which is forcibly engaged with the terminal annular lock edge of the retaining ring so as to join the end cap, and thus said filter cartridge, to the end plates.

32 Claims, 3 Drawing Sheets

Figure 1:
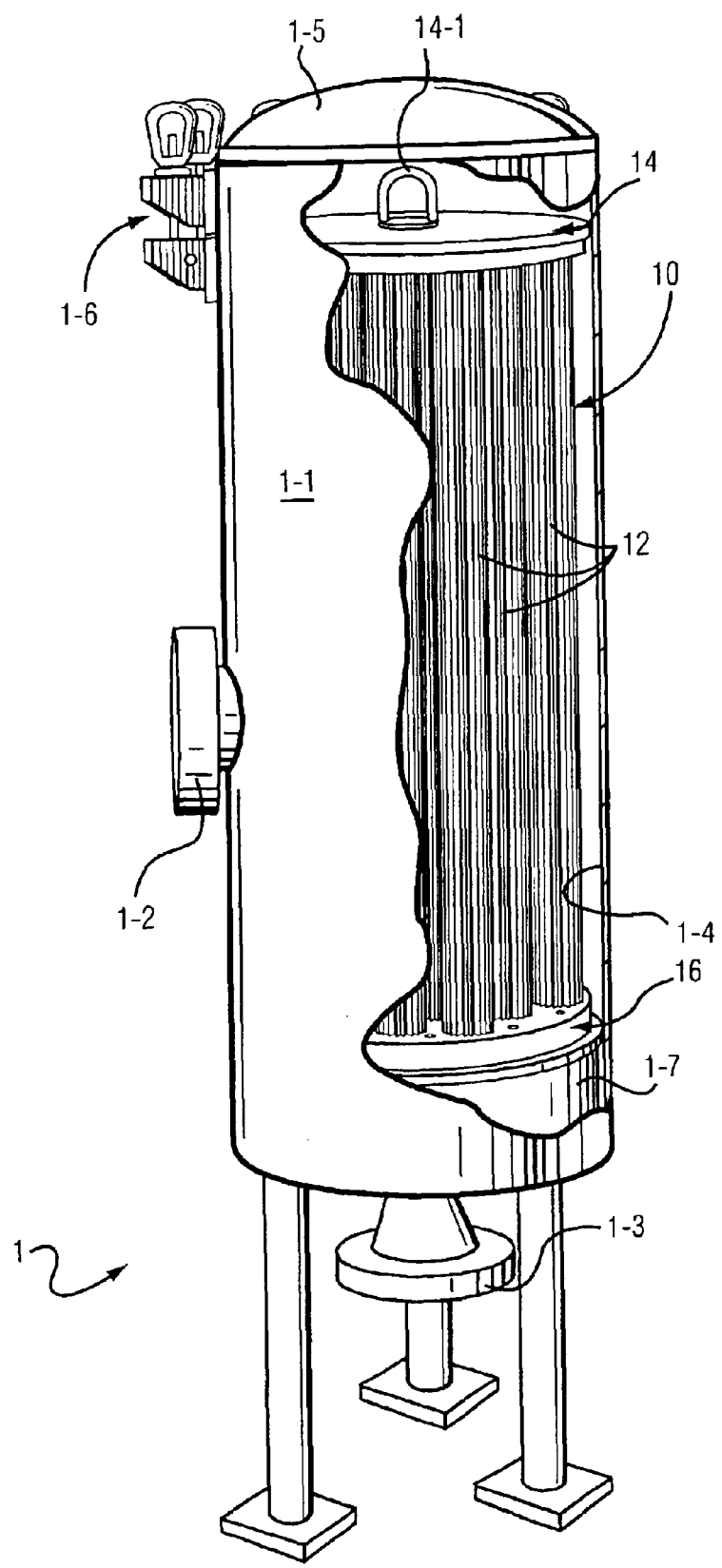

CAGED PLEATED FILTER CARTRIDGE ASSEMBLIES AND FILTRATION SYSTEMS EMPLOYING THE SAME

CROSS-REFERENCE TO RELATED APPLICATION

This application is related to commonly owned U.S. Pat. No. 6,495,037, the entire content of which is expressly incorporated hereinto by reference.

FIELD OF THE INVENTION

The present invention relates generally to the field of filtration assemblies. In its more preferred forms, the present invention relates to multiple tubular filter cartridges having pleated filter media, whereby the filter cartridges are held together collectively as a unit ("caged") in parallel relationship to one another between spaced-apart end plates, and to the filtration systems which employ the same.

BACKGROUND AND SUMMARY OF THE INVENTION

Caged filter cartridge assemblies are known and have been employed conventionally in fluid-filtration assemblies. Conventional caged filter assemblies typically include an array comprised of a large number (e.g., eighteen) of generally tubular filter cartridges positioned parallel to one another between a pair of spaced-apart end plates. A tie rod extends generally centrally of the filter cartridge array and structurally unites the spaced-apart end plates to form an integral unit.

Recently, in U.S. Pat. No. 6,495,037 (hereinafter "the '037 patent"), novel caged filter cartridge assemblies are disclosed whereby the structural integrity of the assemblies is improved. More specifically, the invention described in the '037 patent is embodied in tie rod-less caged filter cartridge assemblies wherein the structural integrity of the assembly is provided solely by means of the individual filter cartridges. That is, the end plates of the filter cartridge assembly are provided with plural seat recesses each adapted to receive an end portion of a respective filter cartridge. An annular lock ring is associated with each seat recess so as to immovably lock the filter cartridge ends therewithin. In such a manner, each of the individual filter cartridges serves to structurally unite the opposed spaced-apart end plates one to another in the absence of a tie rod so that the collective torsional and longitudinal rigidity of the assembly is significantly enhanced as compared to conventional tie rod assemblies.

As may be appreciated, the caged filter cartridge assemblies disclosed in the '037 patent are especially adapted to be employed with melt-blown filter media (i.e., so as to achieve the desired fluid sealing effect between the annular lock ring and the filter media. Thus, the structural integrity of the caged filter cartridges and the sealing effect provided by the annular lock ring may not be evident when pleated filter media is employed. It would therefore be highly desirable if filter cartridge assemblies having pleated filter media could be used with the end plates as disclosed in the '037 patent. It is towards fulfilling such a need that the present invention is directed.

Broadly, therefore, the present invention relates to caged filter cartridge assemblies which include filter cartridges provided with pleated filtration media. More specifically, in accordance with the present invention, caged filter cartridge assemblies are provided which have a pair of coaxially spaced-apart end plates, and a number of tubular filter cartridges extending between said end plates. These end plates include seat recesses having a coaxially disposed retaining ring establishing an annular terminal lock edge. The filter cartridges include end caps at each opposed end thereof which are received within respective ones of said seat recesses. The end caps have at least one annular lock ring which is forcibly engaged with the terminal annular lock edge of the retaining ring so as to join the end cap, and thus said filter cartridge, to the end plates.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2:
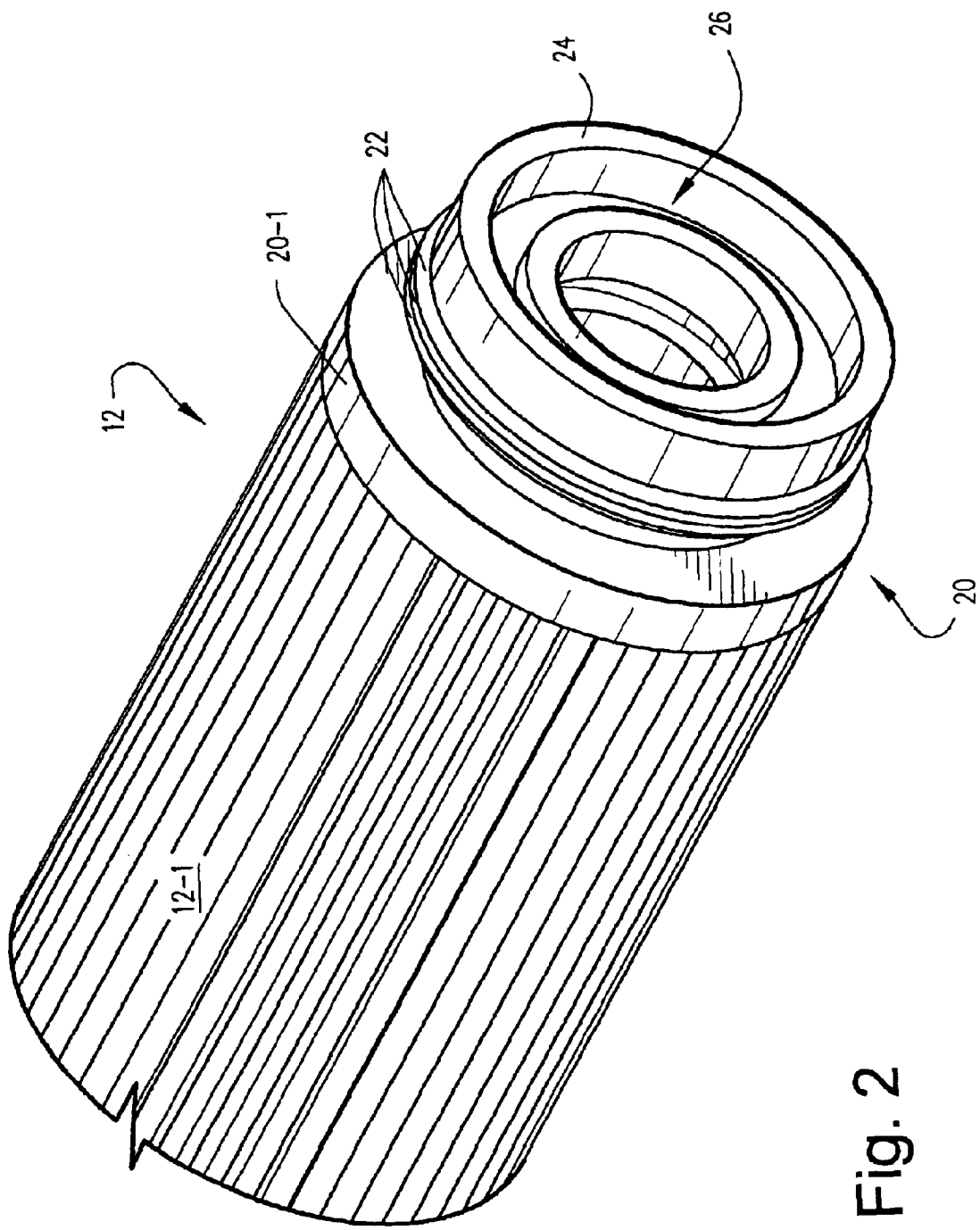
Figure 3:
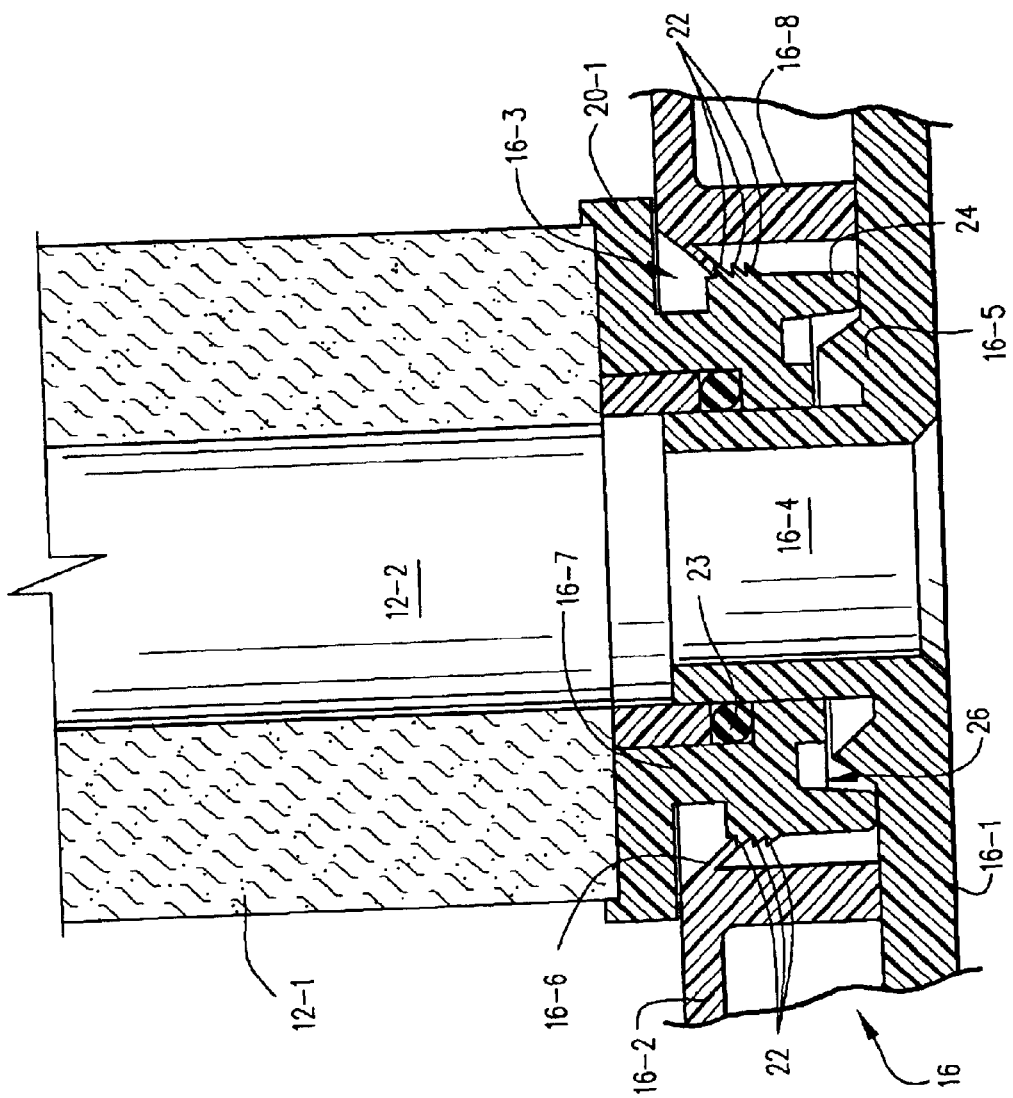

Reference will hereinafter be made to the accompanying drawings, wherein like reference numerals throughout the various FIGURES denote like structural elements, and wherein;

FIG. 1 is an elevational perspective view of a filtration system, partly in section, which employs a caged filter cartridge assembly in accordance with the present invention;

FIG. 2 is an enlarged perspective view of an exemplary filter cartridge in accordance with the present invention having pleated filter media and a universal end cap allowing the filter cartridge to be employed with the end plates of the caged assembly; and FIG. 3 is an enlarged cross-sectional view showing the structural interaction between the end cap of the filter cartridge shown in FIG. 2 and the end plate of the caged assembly.

DETAILED DESCRIPTION OF THE INVENTION

Accompanying FIG. 1 depicts a filtration system 1 which includes a caged filter cartridge assembly 10 in accordance with the present invention. As shown, the filtration system 1 generally includes a cylindrical housing 1—1 having fluid inlets and outlets, 1–2, 1–3, respectively, so as to allow fluid to be filtered to enter the interior cylindrical chamber 1–4 of the housing 1—1. The fluid within the housing 1—1 is thus passed through the pleated filtration medium of the individual filter cartridges 12 positioned between opposed spaced-apart upper and lower end plates 14, 16 and then discharged therefrom through the fluid outlet 1–3. A generally U-shaped gasket seal is typically provided around the perimetrical edge of the end plate 16 so as to provide a fluid seal between it and the interior wall of the housing 1—1. The cylindrical housing 1—1 is closed at its upper end by cover 1–5 which is securely yet removably coupled to the housing 1—1 by means of conventional swing bolt and eye nut assemblies 1–6. When the cover 1–5 is opened, therefore, the entire caged filter cartridge assembly 10 may be removed from the interior chamber 1–4, assisted as may be necessary by means of powered lift devices attached to the lift ring 14-1 of the top plate 14.

An exemplary end of a filter cartridge 12 that may be employed in the practice of the present invention is depicted in accompanying FIG. 2. As shown therein, the preferred filter cartridges 12 employed in the present invention include a pleated filtration media 12-1 which is fashioned into a generally tubular elongate structures having a central cylindrical interior fluid passageway. The pleated filtration media 12 may be formed from any non-woven or paper-like sheet material which is pleated in accordance with well known techniques. The pleated filtration media 12 may therefore be comprised of several layers of filtration sheet materials so as to achieve the desired filtration properties.

The pleated filtration media 12-1 is physically attached (e.g., via suitable adhesive) to an annular attachment flange 20-1 associated with the universal end cap 20 in accordance with the present invention. The universal end cap 20 is especially designed so as to be accommodated within the individual seat recesses of the end plate 16, an exemplary one of which is identified in the FIG. 3 as reference numeral 16-3. It will be understood in this regard that the other end of the filter cartridge 10 depicted in FIG. 2 also most preferably has an identical one of the end caps 20 affixed thereto so as to be received within a seat recess associated with the end plate 14 (and thereby improve the structural integrity of the caged assembly 10). Thus, it will be understood that the discussion below with respect to the end plate 16 and its structural and functional association with the end cap 20 is likewise applicable to identical structures present in end plate 14.

As shown in FIG. 3, each of the seat recesses 16-3 includes a cylindrical support tube 16-4 projecting outwardly from, and being a unitary part of, the base plate 16-1. The support tube 16-4 is sized so as to be received within the central cylindrical passageway 12-2 defined by the pleated filter media 12-1 associated with each filter cartridge 12. The filtered fluid is thereby directed into the discharge plenum 1–7 of the filtration system 1 and on to the discharge opening 1–3 in fluid-communication therewith (see FIG. 1).

A circular rigid end seal 16-5 is provided as a one-piece structure with the base plate 16-1 and coaxially surrounds the support tube 16-4. The generally triangularly shaped end seal 16-5 is employed in those instances as described in the '037 patent where the filter media is in the form of a non-woven mass of melt-blown fibers, and thus does not really have a structural benefit when used with the end cap 20 in accordance with the present invention. As such, the end plate 16 may be employed universally with respect to a variety of filter media.

A retaining ring 16-6 is provided unitarily as a part of the seat plate 16-2 in coaxially laterally surrounding relationship to the support tube 16-4. The retaining ring 16-6 most preferably defines the generatrices of a conical surface and thus establishes an annular lock edge 16-7 which diametrically constricts the upper region of the recessed seat 16-3. The conical segment shape of the retaining ring 16-6 and its annular edge 16-7 cooperate to ensure that the former is flexed outwardly by insertion of an end cap 20 associated with a filter cartridge 12 into the seat recess 16-3 to thereby bias the annular edge 16-7 thereof forcibly into locking engagement with one of the circumferential lock rings 22 associated with the end cap 20 (see also FIG. 2).

The concentric plurality of lock rings 22 provided on the end cap 20 allows for tolerance of slight (but meaningful) lengthwise variations from one filter cartridge to another. That is, by providing the concentric plurality of lock rings 22, it is virtually ensured that the annular edge 16-7 of the retaining ring 16-6 will be engaged with one of the rings 22, notwithstanding the fact that some lengthwise variation of individual ones of the filter cartridges 12 may be present.

An annular support wall 16-8 is formed as a unitary structure with the seat plate 16-2 at one end thereof in close annular adjacent proximity to the seat ring 16-6. The opposite end of the support wall 16-8 extends to, and is in contact with, the base plate 16-1. The support wall 16-8 thereby provides annular structural rigidity around the retaining ring 16-6 as well as establishing and maintaining a spaced-apart relationship between the retaining ring 16-6 and the base plate 16-1.

An O-ring seal 23 is provided in an interior recess of the end cap 20 so as to be in annular surrounding contact with the support tube 16-4. Thus, although the rigid end seal 16-5 is ineffectual to provide a fluid-tight seal when the end cap 20 is positioned in the recess 16-3, a liquid seal is nonetheless established by virtue of the sealing contact between the O-ring seal 23 and the external surface of the support tube 16-4. It will be observed in this regard, that the end cap 20 is provided with an annular foot wall 24 so as to establish a sufficiently sized annular recess 26 to accommodate the rigid end-seal 16-5 (i.e., so the end seal 16-5 does not interfere with the proper positioning of the end cap 20 within the recess 16-3).

In use, a caged filter cartridge assembly 10 is fabricated by forcibly inserting respective end caps 20 affixed to each of the opposed ends of the individual filter cartridges 12 into the seat recesses formed in each of the end plates 14, 16. As noted previously, inserting the end caps 20 of the filter cartridges 12 into the seat recesses will immovably lock the filter cartridges 12 relative to the end plates 14, 16. The individual filter cartridges 12 will thus collectively serve to unite structurally the opposed end plates 14, 16 (i.e., in the absence of separate tie rods extending between the end plates 14, 16). As a result, the torsional and longitudinal rigidity of the assembly 10 is substantially improved as compared to conventional tie rod assemblies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A caged filter cartridge assembly comprising:
a pair of coaxially spaced-apart end plates, and
a number of tubular filter cartridges extending between said end plates, wherein
said end plates include seat recesses having respective coaxially disposed retaining rings establishing annular terminal lock edges which diametrically constrict said seat recesses, wherein
said filter cartridges include end caps at each opposed end thereof which are received within respective ones of said seat recesses and have at least one annular lock ring; and wherein
said retaining rings are flexed outwardly by insertion of said end caps of said filter cartridges in said respective ones of said recesses to thereby cause said annular lock edges thereof to be forcibly engaged circumferentially with said at least one annular lock rings so as to join said end caps, and thus said filter cartridges to said end plates.

2. The caged filter cartridge assembly as in claim 1, wherein said seat rings define segments of conical surfaces.

3. The caged filter cartridge assembly as in claim 2, wherein said seat recesses include a cylindrical support tube which projects into a central cylindrical passageway of respective ones of said filter cartridges.

4. The caged filter cartridge assembly of claim 3, wherein said seat rings are unitarily formed with said end plate.

5. The caged filter cartridge assembly of claim 4, wherein said end plate includes a seat plate having annular support walls which define said seat recesses.

6. The caged filter cartridge assembly of claim 5, wherein said end plate has a base plate attached to said seat plate, and wherein said support walls include one end thereof in close annular adjacent proximity to respective said seat rings, and an opposite end thereof which extends to, and is in contact with said base plate.

7. The caged filter cartridge assembly of claim 6, wherein said support walls are unitarily formed with said seat plate.

8. The caged filter cartridge assembly of claim 7, wherein said end caps include an interior recess which annularly surrounds said support tube, and an O-ring seal seated in said recess to provide a fluid-tight seal between said end cap and said support tube.

9. The caged filter cartridge assembly of claim 1, wherein at least one of said end plates includes base and seat plates joined to one another.

10. The caged filter cartridge assembly of claim 9, wherein said seat plate defines said seat recesses.

11. The caged filter cartridge assembly as in claim 10, wherein said seat recesses include a cylindrical support tube which projects into a central cylindrical passageway of respective ones of said filter cartridges.

12. The caged filter cartridge assembly of claim 11, wherein said seat plate has annular support walls which define said seat recesses.

13. The caged filter cartridge assembly of claim 12, wherein said support walls include one end thereof in close annular adjacent proximity to respective said seat rings, and an opposite end thereof which extends to, and is in contact with said base plate.

14. The caged filter cartridge assembly of claim 13, wherein said support walls are unitarily formed with said seat plate.

15. The caged filter cartridge assembly of claim 14, wherein said end caps include an interior recess which annularly surrounds said support tube, and an O-ring seal seated in said recess to provide a fluid-tight seal between said end cap and said support tube.

16. The caged filter cartridge assembly of claim 10, wherein said seat rings are formed unitarily with said seat plate.

17. The caged filter cartridge assembly as in claim 16, wherein said seat rings define segments of conical surfaces.

18. A filtration system comprising a filtration housing defining an interior space and having fluid inlets and outlets for introducing fluid into, and discharging fluid from, respectively, said interior space of said housing, and a caged filter cartridge assembly according to any one of claims 1–9 and 10–15 positioned within said interior space of said filtration housing.

19. The caged filter cartridge assembly of claim 1 or 10, wherein said filter cartridge includes a pleated filter medium.

20. The caged filter cartridge assembly of claim 1 or 10, wherein said end caps have a concentric plurality of lock rings, and wherein said annular lock edges of said seat rings are forcibly engaged circumferentially with respective ones of said lock rings.

21. The caged filter cartridge assembly of claim 1, wherein one of said end plates includes a lift ring.

22. A filter cartridge assembly comprising an end plate and a filter cartridge connected to said end plate, wherein
   (I) said end plate comprises a seat recess having a coaxially disposed retaining ring establishing an annular terminal lock edge which diametrically constricts said seat recess, and wherein
   (II) said filter cartridge comprises an end cap at an end thereof which is received within said seat recess and having at least one annular lock ring, and wherein
   (III) said retaining ring is flexed outwardly by insertion of said end cap of said filter cartridge in said recess to thereby cause said annular terminal lock edge thereof to be forcibly engaged circumferentially with said at least one annular lock ring of said end cap so as to join said end cap, and thus said filter cartridge, to said end plate.

23. The filter cartridge assembly as in claim 22, wherein said seat recess includes a cylindrical support tube which projects into a central cylindrical passageway of said filter cartridge.

24. The filter cartridge assembly of claim 23, wherein said end plate has an annular support wall which defines said seat recess.

25. The filter cartridge assembly of claim 24, wherein said end plate includes a seat plate which defines said seat recess and is unitarily formed with said seat ring, and a base plate joined to said seat plate, wherein said seat plate comprises a support wall having one end thereof in close annular adjacent proximity to said seat ring, and an opposite end thereof which extends to, and is in contact with, said base plate.

26. The filter cartridge assembly of claim 25, wherein said support wall is unitarily formed with said seat plate.

27. The filter cartridge assembly of claim 26, wherein said end cap includes an interior recess which annularly surrounds said support tube, and an O-ring seal seated in said recess to provide a fluid-tight seal between said end cap and said support tube.

28. The filter cartridge assembly of claim 22, wherein said seat ring is formed unitarily with said seat plate.

29. The filter cartridge assembly as in claim 28, wherein said seat ring defines a segment of a conical surface.

30. The filter cartridge assembly of claim 22, wherein said filter cartridge includes a pleated filter medium.

31. The filter cartridge assembly of claim 30, wherein said pleated filter medium comprises a sheet of nonwoven material.

32. The filter cartridge assembly of claim 22, wherein said end cap has a concentric plurality of lock rings, and wherein said annular lock edge of said seat ring is forcibly engaged circumferentially with a respective one of said lock rings.

* * * * *